United States Patent
Zhang et al.

(10) Patent No.: US 10,637,040 B2
(45) Date of Patent: Apr. 28, 2020

(54) BLENDED OR MULTI-COATED ELECTRODES FOR LITHIUM ION BATTERY AND CAPACITOR HYBRID SYSTEM

(71) Applicant: GM GLOBAL TECHNOLOGY OPERATIONS LLC, Detroit, MI (US)

(72) Inventors: Xiusheng Zhang, Shanghai (CN); Xiaochao Que, Shanghai (CN); Haijing Liu, Shanghai (CN)

(73) Assignee: GM Global Technology Operations LLC, Detroit, MI (US)

(*) Notice: Subject to any disclaimer, the term of this patent is extended or adjusted under 35 U.S.C. 154(b) by 157 days.

(21) Appl. No.: 15/704,122

(22) Filed: Sep. 14, 2017

(65) Prior Publication Data

US 2018/0034037 A1    Feb. 1, 2018

Related U.S. Application Data

(63) Continuation-in-part of application No. 15/221,963, filed on Jul. 28, 2016.

(51) Int. Cl.
*H01M 4/04* (2006.01)
*H01M 4/13* (2010.01)
(Continued)

(52) U.S. Cl.
CPC .......... *H01M 4/0404* (2013.01); *H01G 11/06* (2013.01); *H01G 11/12* (2013.01);
(Continued)

(58) Field of Classification Search
CPC .... H01M 4/0404; H01M 4/131; H01M 4/587; H01M 4/505; H01M 4/485; H01M 4/364;
(Continued)

(56) References Cited

U.S. PATENT DOCUMENTS

| 7,531,274 | B1* | 5/2009 | Roy | H01M 4/131 |
|---|---|---|---|---|
| | | | | 429/231.7 |
| 2002/0028380 | A1* | 3/2002 | Tanjo | H01M 4/131 |
| | | | | 429/209 |

(Continued)

FOREIGN PATENT DOCUMENTS

| CN | 101847764 A | 9/2010 |
| CN | 102201604 A | 9/2011 |

OTHER PUBLICATIONS

Liu et al., U.S. Appl. No. 15/221,963 entitled "Hybrid Cell Design of Alternately Stacked or Wound Lithium Ion Battery and Capacitor Electrodes," filed Jul. 28, 2016.

*Primary Examiner* — Lisa S Park
(74) *Attorney, Agent, or Firm* — Reising Ethington P.C.

(57) ABSTRACT

Lithium-utilizing electrochemical cells, providing battery and hybrid-capacitor activity, are formed of one or more lithium battery anodes, one or more lithium battery cathodes, and one or more positive-charge or negative-charge hybrid capacitor electrodes which are formed of a combination of capacitor particles with one of anode or cathode particles. The anode and cathodes are formed of porous layers of particles of anode or cathode material, bonded to each side of a current collector foil. The hybrid capacitor electrodes are formed of porous layers of capacitor particles, mixed or layered with anode or capacitor particles, bonded to each side of a current collector foil. The compositions of the hybrid capacitors are determined to balance the capacities of the electrodes in the lithium-ion electrochemical cell to intercalate or adsorb lithium cations and corresponding anions in the electrolyte infiltrating the pores of the electrode materials.

20 Claims, 4 Drawing Sheets

(51) Int. Cl.
| | |
|---|---|
| *H01M 4/38* | (2006.01) |
| *H01M 12/00* | (2006.01) |
| *H01G 11/50* | (2013.01) |
| *H01M 12/02* | (2006.01) |
| *H01M 4/587* | (2010.01) |
| *H01M 4/136* | (2010.01) |
| *H01M 4/485* | (2010.01) |
| *H01M 4/36* | (2006.01) |
| *H01M 4/133* | (2010.01) |
| *H01M 4/131* | (2010.01) |
| *H01G 11/82* | (2013.01) |
| *H01M 4/505* | (2010.01) |
| *H01G 11/28* | (2013.01) |
| *H01G 11/12* | (2013.01) |
| *H01G 11/06* | (2013.01) |
| *H01G 11/46* | (2013.01) |

(52) U.S. Cl.
CPC ............. *H01G 11/28* (2013.01); *H01G 11/50* (2013.01); *H01G 11/82* (2013.01); *H01M 4/13* (2013.01); *H01M 4/131* (2013.01); *H01M 4/133* (2013.01); *H01M 4/136* (2013.01); *H01M 4/364* (2013.01); *H01M 4/382* (2013.01); *H01M 4/485* (2013.01); *H01M 4/505* (2013.01); *H01M 4/587* (2013.01); *H01M 12/005* (2013.01); *H01M 12/02* (2013.01); *H01G 11/46* (2013.01)

(58) Field of Classification Search
CPC ........ H01M 4/136; H01M 4/133; H01M 4/13; H01M 12/02; H01M 4/382; H01M 12/005; H01G 11/28; H01G 11/12; H01G 11/06; H01G 11/82; H01G 11/50; H01G 11/46

See application file for complete search history.

(56) References Cited

U.S. PATENT DOCUMENTS

| | | | |
|---|---|---|---|
| 2012/0100437 A1* | 4/2012 | Nakahara | H01G 11/02 429/338 |
| 2012/0282495 A1* | 11/2012 | Kise | H01M 4/131 429/7 |
| 2015/0263336 A1* | 9/2015 | An | H01M 4/133 429/221 |

* cited by examiner

BLENDED OR MULTI-COATED ELECTRODES FOR LITHIUM ION BATTERY AND CAPACITOR HYBRID SYSTEM

CROSS-REFERENCE TO RELATED APPLICATION

This application is a continuation-in-part of Ser. No. 15/221,963, filed Jul. 28, 2016, and titled Hybrid Cell Design of Alternately Stacked or Wound Lithium Ion Battery and Capacitor Electrodes. The complete contents of that application are incorporated herein by reference.

TECHNICAL FIELD

Lithium-ion battery anodes and cathodes, formed of a porous layer of anode or cathode material particles on both sides of a current collector foil, are used in combination with compatible two side-coated hybrid capacitor electrodes to form hybrid electrochemical cells. The hybrid capacitor electrodes are formed of particles of capacitor material, blended with particles of anode or cathode battery material, and bonded as porous layers to both sides of the current collector. Or the hybrid capacitor electrodes may be formed with a porous layer of battery material particles overlying a porous layer of capacitor particles (or vice versa) bonded to both sides of the current collector. The electrodes are prepared in a desired shape, rolled or stacked with intervening porous separators, and the assembled cell subsequently infiltrated with a non-aqueous, lithium ion-conducting electrolyte solution to provide a predetermined combination of battery and capacitor capacities in each such individual hybrid cell. The respective lithium ion-using capacities of battery anode and cathode materials, bonded in their electrodes, and the corresponding capacities of the hybrid capacitor/battery material electrodes in the cells are proportionally balanced to best utilize the flow of lithium ions in each cell. The capacity, coulombic efficiency, and life of the hybrid cells are thereby increased.

BACKGROUND OF THE INVENTION

The material presented as background information in this section of the specification is not necessarily prior art.

Electric-powered automotive vehicles use multi-cell batteries to provide electrical energy for providing electrical power for driving the vehicle and for providing electrical energy to many devices on the vehicle. Batteries comprising many lithium-ion electrochemical cells are examples of such electrical power sources. And such batteries are used in many non-automotive applications.

In some applications, it may be useful to combine a lithium-ion battery with a capacitor. For example, such capacitors may be charged during braking of the vehicle and the stored electrical charge used in recharging cells of the lithium-ion battery.

There is a need for a practice to jointly form, package, and employ cells for lithium-ion batteries and such capacitors for efficiency in their mutual interconnection and interaction.

SUMMARY OF THE INVENTION

In accordance with practices of this invention, anode and cathode materials for lithium-ion batteries are used in varying combinations with compatible capacitor materials to form hybrid capacitors. The hybrid capacitors are used in combinations with anodes and cathodes for hybrid lithium-ion electrochemical cells. Such hybrid lithium ion cells conveniently provide different predeterminable combinations of lithium-ion battery properties and capacitor properties. The electrodes for each cell are formed of particles of the respective electrode materials which are resin bonded as porous, uniformly thick, layers to both sides of a compatible current collector foil. The hybrid capacitors are formed of capacitor particles, blended (mixed) with battery particles, or layered with battery particles, in a hybrid capacitor electrode.

Such combinations of lithium battery electrodes and hybrid capacitor electrodes can be readily adapted and arranged to produce different, useful combinations of energy densities (Wh/kg) and power densities (W/kg) in a hybrid electrochemical cell that better adapts its use in different applications. In the following text, the anode is often referred to as the negative electrode (as it is during cell discharge) and cathode is often referred to as the positive electrode (as it is during cell discharge). One or more hybrid, combined capacitor/battery material electrodes are grouped and assembled with the battery anode electrodes and/or the battery cathode electrodes. Each hybrid capacitor electrode(s) will have the same electrical charge as the battery electrode with which it is electrically connected. In an assembled cell the hybrid capacitor will face at last one anode or cathode of opposite electrical charge.

In each hybrid cell of this invention, there will be at least two electrically-connected negative electrodes or two electrically-connected positive electrodes. And there will be an equal number of negative and positive electrodes in the hybrid cell. For example, a hybrid electrochemical cell may consist of two negative electrodes of lithium intercalating anode material inter-placed with one positive electrode of lithium-intercalating cathode material and one positive electrode of hybrid capacitor material in which capacitor particles are blended or layered with particles of active cathode material.

Each such two-side coated electrode is typically less than a millimeter in thickness. And each electrode is shaped in its other two dimensions so that alternating positively charged and negatively charged electrodes may be assembled with interposed, thin, porous separator layers in the formation of a hybrid battery/capacitor electrochemical cell. Such a hybrid cell may be formed of a stack of equal numbers of like-shaped (typically rectangular shaped) alternating positive and negative electrodes and separators. In a different cell assembly method, the cell may be formed by winding like-shaped (typically long rectangular strips) alternating two-sided positive and negative electrodes and separators layers into rolled assemblies. In an assembled, formed cell, the micropores of the alternating electrodes and separators are filled with a lithium cation-conducting electrolyte composed of one or more lithium salts (such as $LiPF_6$) dissolved in a non-aqueous liquid electrolyte that functions at the required operating temperature range of the hybrid cell.

By way of illustrative examples, suitable anode materials include graphite particles or lithium titanate particles ($Li_4Ti_5O_{12}$, LTO); suitable cathode materials include particles of $LiMn_2O_4$ (LMO), $LiNi_xMn_yCo_{(1-x-y)}O_2$ (NMC) or particles of $LiFePO_4$ (LFP); and a suitable capacitor material is particles of activated carbon. In the operation of a cell the anode particles and cathode particles alternately intercalate and de-intercalate lithium ions (Li+) as the cell is charged and discharged. Positively charged capacitor electrode particles alternately adsorb and desorb anions (such as $PF_6^-$), and negatively charged capacitor electrode particles alternately adsorb and desorb cations (such as Li$^+$). In general, the process of intercalation/de-intercalation occurs throughout the whole volume of the selected particulate battery electrode material. A gram of battery electrode material can usually intercalate a greater amount of lithium ions than are adsorbed on the surfaces of a like amount of capacitor particles. But the release of lithium ions from battery electrode particles is typically slower than the release of ions from selected capacitor particles. The battery particles are typically capable of producing a greater energy density (Wh/kg) per gram than capacitor particles, but the capacitor particles release adsorbed lithium ions faster and are typically capable of providing a greater power density (W/kg) than battery particles.

The amounts of the respective electrode materials are determined by the cell design with its intended energy density and power density. The selected compositions of the anode, cathode, and capacitor materials have known molar or weight capacities to interact with the lithium anions and the cations of the selected electrolyte. And the observed capacities of the particles of the electrode materials, in their bonded layers on a current collector foil may be confirmed experimentally. The capacity of battery electrode material may be determined by its molar content (mAh/g) and actual weight loading. The capacity and amount of capacitor material may also be determined by its molar content or weight. Sometimes an N/P ratio is used in this specification. The N/P ratio refers to the negative electrode capacity (anode during cell discharge) to positive electrode capacity (cathode capacity).

Sometimes it is convenient to devise or prepare a hybrid cell starting with an existing design of a lithium-ion battery cell. The respective amounts of anode and cathode electrode materials are known and their function demonstrated. And often the electrode members of the existing battery cell have been organized and prepared to have substantially equal thicknesses for the assembly of the cell packages making up the battery. The required strategy in making a new hybrid cell, or to convert an existing battery cell to a hybrid cell, is to determine the locations and amount(s) of anode materials, cathode materials and mixed capacitor/battery materials to be used in preparing the respective electrode members for a desired hybrid cell of desired energy and power densities. It is recognized herein that the molar (or weight) capacity of battery electrode materials to react with the electrolyte to intercalate and de-intercalate lithium ions and corresponding anions significantly exceeds the molar or weight capacities of useful capacitor material particles to absorb and de-absorb the same ions in the same electrochemical cell environment. It is necessary to balance the ion-utilizing capacities of the respective electrodes in order to best utilize the potential advantages and properties of a hybrid lithium-ion battery/capacitor cell. In order to suitably balance the respective capacities (for example, to balance the N/P ratio) of the electrodes of the hybrid cell, several structural changes are disclosed and illustrated in this specification. Mismatches in the relative amounts and thicknesses of battery electrode materials and capacitor electrode materials must be accommodated in the design and assembly of the electrodes of a hybrid lithium-ion battery/capacitor cell.

Other objects and advantages of the invention will be apparent from specific illustrations of practices of the invention which follow below in this specification.

BRIEF DESCRIPTION OF THE DRAWINGS

FIGS. 1A-1J are schematic side (or edge) views of cell units of two opposing electrodes for use in forming hybrid electrochemical cells in accordance with different embodiments of this invention. The views schematically illustrate the thicknesses of coatings of the electrode materials. The side section of each layer of anode particles is illustrated with light speckling. The side section of each layer of cathode particles is illustrated with relatively dark speckling. The side section of each layer of capacitor particles is indicated with slanted cross-hatching. Each layer of a mixture of capacitor particles and anode particles is illustrated with a relatively light particle mixture. And each layer of a mixture of capacitor particles and cathode particles is illustrated with a relatively dark particle mixture. In these drawing figures, the illustrated thicknesses of the electrode particles are intended to indicate the locations of the electrode materials and are not intended to represent the relative amounts of the electrode materials.

In each of the cell units, the porous separators are illustrated with alternating thick and thin slanted lines, and dots. Each illustrated cell unit is formed of an upstanding current collector foil with a connector tab extending upwardly from the top side of the foil. A porous layer of a particulate electrode material is bonded to each major face of the current collector foil. In some embodiments, a second porous layer of electrode material is co-extensively bonded to the first layer. The positive (+) and negative (−) signs above the current collector tabs indicates the electrical charge of the charged electrode in the cell unit (as it is being discharged). The outer surfaces of electrode material of each electrode are placed against a porous separator layer. In an assembled cell, the outer surfaces of the electrodes would lie against the adjoining separators and the pores of the electrode materials and separators would be filled with a liquid electrolyte.

FIG. 1A illustrates a first cell unit (A) of two opposing electrodes which is formed of positively-charged cathode material (such as LMO particles) for a lithium-ion battery cell and negatively charged anode material (e.g., LTO particles) for a lithium ion battery cell.

FIG. 1B illustrates the second cell unit (B) which is formed of a positively charged (+) hybrid capacitor electrode formed of a mixture of capacitor particles (such as activated carbon particles, AC) and cathode material particles, and a negatively charged (−) hybrid capacitor electrode formed of a mixture of capacitor particles and anode material particles.

FIG. 1C illustrates the third cell unit (C) which is formed of Li-battery cathode material (+) electrode and a hybrid capacitor electrode (−) which is a bonded porous layer of a mixture of capacitor particles and anode material particles.

FIG. 1D illustrates a fourth cell unit (D) formed of a positively charged capacitor electrode (+) which is a bonded porous layer of a mixture of capacitor particles and cathode particles and a negatively charged electrode (−) of anode material particles.

In FIG. 3A, two lithium titanate (LTO) anodes are paired with a lithium manganese oxide (LMO) battery cathode and a layered AC'+LMO' hybrid capacitor electrode. In this embodiment, the hybrid capacitor is formed of a layer of AC particles bonded to each side of a current collector with a coextensive layer of bonded LMO particles overlying the AC layer. The LTO anode members are electrically connected and indicated as negatively charged as they would be when the hybrid cell is being discharged. The LMO battery cathode and the layered hybrid capacitor electrode are electrically connected and indicated as positively charged. Each modification is for the purpose of equalizing the flow of lithium ions during the charging of the hybrid cell.

In FIG. 3B, two lithium titanate (LTO) anodes and a negatively charged (−) layered hybrid AC'+LTO' capacitor electrode are assembled with two LMO cathodes and a positively charged (+) layered hybrid AC'+LMO' capacitor electrode. In this embodiment, the AC'+LMO' layered hybrid capacitor is formed of a layer of AC particles bonded to each side of a current collector with a coextensive layer of bonded LMO particles overlying the AC layer. And the layered hybrid AC'+LTO' capacitor electrode is formed of a porous layer of AC particles bonded to each side of a current collector with a coextensive porous layer of bonded LTO particles overlying the AC layer. The anode members are electrically connected and indicated as negatively charged. The cathode members are electrically connected and indicated as positively charged. Each modification is for the purpose of equalizing the flow of lithium ions during the charging of the hybrid cell.

In FIG. 4A, two lithium titanate (LTO) anodes are paired with a lithium manganese oxide (LMO) battery cathode and a reverse-layered hybrid AC"+LMO" capacitor electrode. In this embodiment, the reverse-layered, hybrid capacitor is formed of a layer of LMO particles bonded to each side of a current collector with a coextensive layer of bonded AC particles overlying the LMO layer. The LTO anode members are electrically connected and indicated as negatively charged as they would be when the hybrid cell is being discharged. The LMO battery cathode and the hybrid reverse-layered capacitor electrode are electrically connected and indicated as positively charged. Each modification is for the purpose of equalizing the flow of lithium ions during the charging of the hybrid cell.

In FIG. 4B, two lithium titanate (LTO) anodes and a negative charged (−) reverse-layered hybrid AC"+LTO" capacitor electrode are assembled with two LMO cathodes and a positive charged (+) hybrid AC"+LMO" capacitor electrode. In this embodiment, the AC"+LMO" reverse-layered hybrid capacitor is formed of a layer of LMO particles bonded to each side of a current collector with a coextensive layer of bonded AC particles overlying the LMO layer. And the hybrid AC"+LTO" capacitor electrode is formed of a porous layer of LTO particles bonded to each side of a current collector with a coextensive porous layer of bonded AC particles overlying the LTO layer. The anode members are electrically connected and indicated as negatively charged. The cathode members are electrically connected and indicated as positively charged. Each modification is for the purpose of equalizing the flow of lithium ions during the charging of the hybrid cell.

DESCRIPTION OF PREFERRED EMBODIMENTS

The electrodes of lithium-ion cells are often formed by bonding particles of active electrode materials that have a largest dimension in the range of about 0.5 to 30 micrometers to a compatible metal current collector foil having a thickness of about 5 to 30 micrometers. The particles are bonded in a porous layer of generally uniform thickness on a major surface of the current collector foil so that the layer can subsequently be infiltrated with an electrolyte solution. As stated, the shape of the current collector is often rectangular with side dimensions that provide a predetermined surface area to enable it to support a predetermined quantity of electrode material for a lithium-ion battery electrode or capacitor electrode member. In this specification, hybrid capacitor electrodes are formed of a combination of particles of capacitor material and particles of either active anode material or active cathode material. In some embodiments, a predetermined mixture of capacitor particles and active anode particles or active cathode particles are bonded in a uniform porous layer to each side of a current collector foil. In other embodiments, a porous layer of capacitor particles and an overlying or underlying coextensive porous layer of anode particles or cathode particles are sequentially bonded to each side of a current collector foil. The total sustainable thickness of the layer or overlying layers on each side of the current collector is usually in the range of about 5 μm to 150 μm. In accordance with practices of this invention, the respective quantities of active electrode materials and of the hybrid capacitor materials are carefully determined, for the purpose of enhancing the function of the hybrid battery and capacitor cells in which the materials are employed.

In accordance with practices of this invention, combinations of two or more pairs of positive charged and negative charged electrodes (cell units) are assembled for use in forming hybrid lithium-ion battery/capacitor cells. In a hybrid battery/capacitor electrochemical cell, a predetermined combination of the pairs of opposing electrodes will be assembled with interposed porous separators and the pores of the assembled electrodes and separators infiltrated with a liquid solution of a suitable lithium containing electrolyte.

As stated, in practices of this invention, the hybrid cells are formed of anodes, cathodes, and hybrid capacitors which are formed of various combinations particles of capacitor materials and anode particles or cathode particles.

Activated carbon particles are preferred for use as capacitor materials, whether the electrode in which they are used is positively or negatively charged.

A few examples of suitable electrode materials for an anode electrode (negative electrode during discharge of the cell) of a lithium ion cell are graphite, some other forms of carbon, silicon, alloys of silicon with lithium or tin, silicon oxides ($SiO_x$), metal oxides, and lithium titanate. During cell-discharge, electrons are released from the anode material into the electrical power-requiring external circuit and lithium ions are released (de-intercalated) into an anhydrous lithium ion conducting electrolyte solution. Typically, lithium-ion cell anode materials are resin-bonded as a porous layer onto both sides of a copper current collector foil. When particles of lithium titanate are used as the anode material, they may be bonded to an aluminum current collector foil. A small amount of conductivity enhancing carbon particles may be mixed with the anode particles.

Examples of positive electrode materials (cathode), used in particulate form, include lithium manganese oxide (LMO), lithium nickel oxide, lithium cobalt oxide, lithium nickel manganese cobalt oxide, other lithium-metal-oxides, and lithium iron phosphate. Other materials are known and commercially available. One or more of these materials may be used in an electrode layer. Typically, lithium-ion cell cathode materials are resin-bonded to one or both sides of an aluminum current collector foil. A small amount of conductivity enhancing carbon particles may be mixed with the cathode particles.

In addition to activated carbon particles, suitable capacitor cathode and anode materials include, in particulate form, for example:

Metal Oxides, MOx, where M=Pb, Ge, Co, Ni, Cu, Fe, Mn, Ru, Rh, Pd, Cr, Mo, W, Nb.

Metal Sulfides, such as $TiS_2$, NiS, $Ag_4Hf_3S_8$, CuS, FeS, $FeS_2$.

Other various forms of carbon particles, such as activated carbon fibers, graphite, carbon aerogel, carbide-derived carbon, graphene, graphene oxide, and carbon nanotubes. More than one type of carbon may be used in a blended capacitor material. The same carbon material may be used in both the anode and cathode in an electric double-layer capacitor (EDLC).

Particles of one or more of the following polymers may be used as capacitor material in the cathode of the cell; poly (3-methyl thiophene), polyaniline, polypyrrole, poly(paraphenylene), polyacene, polythiophene, and polyacetylene.

The capacitor particles or lithium-ion battery anode particles or cathode particles are coated or otherwise suitably combined with a suitable amount of a bonding material. In some embodiments of the invention predetermined proportions of capacitor particles and either anode particles or cathode particles are blended and co-deposited as a porous layer of mixed particles on the surfaces of a current collector. In most cases, porous layers of anode particles, cathode particles, or capacitor particles are individually deposited in a porous layer. For example, the particles may be dispersed or slurried with a solution of a suitable resin, such as polyvinylidene difluoride dissolved in N-methyl-2-pyrrolidone, and spread and applied to a surface of a current collector in a porous layer. Other suitable binder resins include carboxymethyl cellulose/styrene butadiene rubber resins (CMC/SBR) or polytetrafluoroethylene (PTFE). The binders are not electrically conducive and should be used in a minimal suitable amount to obtain a durable coating of porous electrode material without fully covering the surfaces of the particles of electrode material.

In many battery constructions, the separator material is a porous layer of a polyolefin, such as polyethylene (PE), polypropylene (PP), non-woven, cellulose/acryl fibers, cellulose/polyester fibers, or glass fibers. Often the thermoplastic material comprises inter-bonded, randomly oriented fibers of PE or PP. The fiber surfaces of the separator may be coated with particles of alumina, or other insulator material, to enhance the electrical resistance of the separator, while retaining the porosity of the separator layer for infiltration with liquid electrolyte and transport of lithium ions between the cell electrodes. The separator layer is used to prevent direct electrical contact between the facing negative and positive electrode material layers and is shaped and sized to serve this function. In the assembly of the cell, the facing major faces of the electrode material/wire layers are pressed against the major area faces of the separator membrane. A liquid electrolyte is typically injected into the pores of the separator and electrode material layers.

In general, metal foil current collectors are coated on both of their major surfaces with porous layers of individual electrode materials. The thicknesses of the coating layers are often varied for the purpose of managing the capacity of the layer to accept and release lithium ions and anions of the lithium electrolyte solution. The thicknesses of the coatings are not necessarily the same on each side of the current collector.

In accordance with practices of this invention, battery/hybrid capacitor cells are formed of an equal number of positive and negative charged electrodes, often four to eight electrodes in total. In the case of prismatic can cells, the number of electrode layers may be up to forty layers. Each electrode is formed of porous layers of particles of active anode material particles for a lithium ion cell, active cathode material particles, or combinations of capacitor electrode materials with anode or cathode material particles, bonded to each side of a suitable current collector foil. The current collector foils are typically rectangular in shape with height and width dimensions suitable for assembly by stacking or winding into a unitary package of one or more electrochemical cells. If the finished electrochemical cell is to be formed of a stacking of two or more pairs of electrodes (and their interposed separators) the current collector foils with their coatings of electrode materials may be nearly square as is practiced in the formation of lithium batteries. If the finished electrochemical cell is to be formed by winding of the cell units and separators, the foils may be quite long as is practiced in the formation of lithium batteries.

Figure 1A:
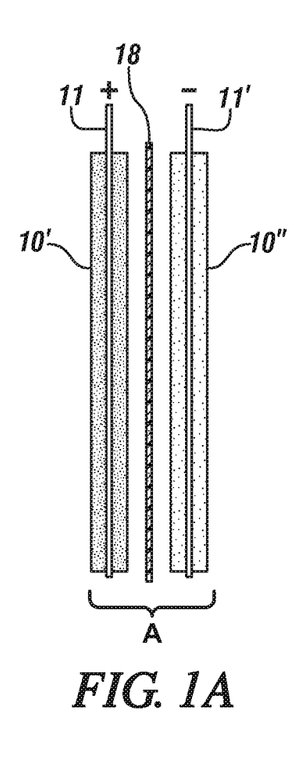

In FIG. 1A, a first cell unit of a pair of electrodes is formed of a cathode and an anode composed for a lithium-ion battery cell. The cell unit A includes a first current collector 11 coated on both sides with thin porous layers of particulate cathode material (e.g., NMC or LMO) 10' bonded to the major faces of the current collector 11. Current collector 11 may, for example, be formed of a rectangular aluminum foil with a suitable connector tab (+) on one side, the top side in FIG. 1A. In FIG. 1A a second current collector 11' (e.g., copper foil, or aluminum foil when LTO is the anode material) is coated on both of its opposing sides with thin porous layers of particulate anode material 10" (e.g., graphite or LTO). Current collector 11' also has a suitable connector tab (−) on its top side. In this cell unit, the cathode is labeled with a plus (+) charge and the anode is labeled with a minus (−) charge as reflects their state in a charged cell, and as the cell is being discharged. Facing surfaces of an anode layer 10" and a cathode layer 10' are placed against a porous separator 18 of like size and shape. Porous separators 18 are typically formed of polymeric sheets.

Figure 1B:
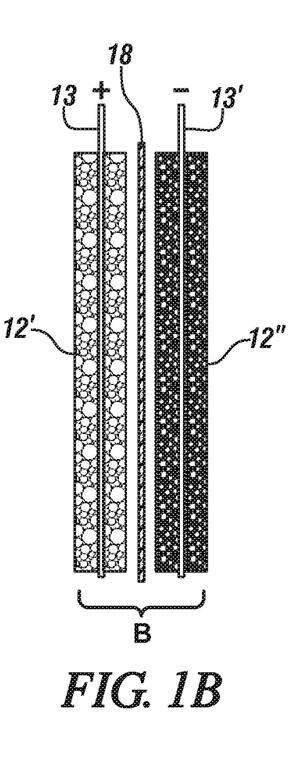

In FIG. 1B, a second cell unit of a pair of electrodes B is illustrated, structurally shaped similarly to the electrode in first cell unit A. Positively charged (+) electrode 12' is formed of a mixture of particles of capacitor material (such as AC) and of particles of cathode material (such as LMO) bonded as porous layers to both sides of a current collector 13. Current collector 13 may be formed of aluminum. Thus, electrode 12' is a hybrid capacitor electrode formed of capacitor particles and cathode particles. Negatively charged (−) hybrid capacitor electrode 12" is formed of a uniform mixture of particles of capacitor material and anode material (such as LTO) bonded as porous layers to both sides of a current collector 13'. Current collector 13' may, for example, be formed of aluminum or copper. The upstanding connector tabs of the respective current collectors (13, 13') are labeled with the respective positive (+) and negative (−) charges of the hybrid capacitor materials. Facing surfaces of the respective hybrid capacitor layers 12', 12" are placed against a porous separator 18 of like size and shape as the surfaces of the hybrid capacitor electrode material. The proportions of capacitor particles and anode particles or cathode particles in each hybrid capacitor electrode is determined in the design of a hybrid cell which is to include such a combination of positive and negative charged hybrid capacitor electrodes. The use of such a combination of hybrid capacitor electrodes is described with respect to FIG. 2B of this specification.

Figure 1C:
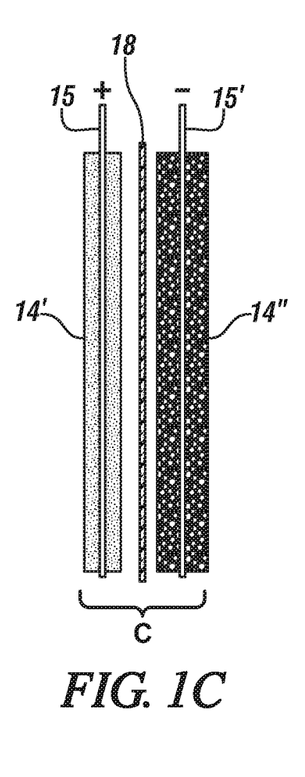

In FIG. 1C, a third cell unit of a pair of electrodes C is formed of a positive electrode of porous layers of cathode material 14' bonded to both sides of a current collector foil (e.g. an aluminum foil) 15. This third unit cell also includes a negative hybrid capacitor electrode formed of porous layers of a mixture of particles of capacitor material and particles of anode material 14" bonded to both sides of a copper current collector foil 15'. When the anode material is LTO, it is typically bonded to an aluminum current collector foil, and capacitor particles may also be bonded to an aluminum current collector foil. Again, the respective charges of the cathode material (+) and the hybrid capacitor material (−) are indicated on the upstanding connector tabs of their respective current collector foils (15, 15'). Facing surfaces of cathode material 14' and of capacitor material 14" are placed against opposite faces of a porous separator 18. The proportions of the materials in the respective electrodes of this combination are based on the intended combination of battery properties and capacitor properties of a hybrid cell. The use of such a combination of cathode and negatively charged hybrid capacitor is illustrated with respect to FIG. 2B of this specification.

Figure 1D:
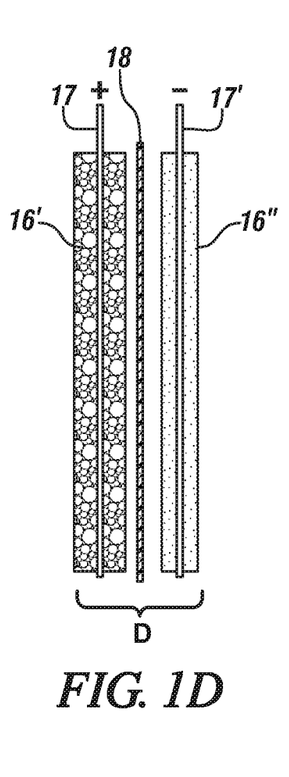

The fourth cell unit D (FIG. 1D) is formed of a positive hybrid capacitor electrode formed of porous layers of a mixture of particles of cathode material particles and capacitor particles 16' bonded to both sides of a current collector foil 17. The fourth cell unit in this embodiment of the invention also includes a negative electrode of porous layers of anode material 16" (e.g., graphite or LTO particles) bonded to both sides of a current collector foil 17'. The respective charges of the capacitor material (+) and the anode material (−) in the charged state of the cell unit are indicated on the upstanding connector tabs of their respective current collector foils (17, 17'). Facing surfaces of hybrid capacitor particles 16" and of anode material 16' are placed against opposite faces of a porous separator 18. The proportions of the materials in the respective electrodes of this combination are based on the intended combination of battery properties and capacitor properties of a hybrid cell. The use of such a combination of anode and positively charged hybrid capacitor is illustrated with respect to FIGS. 2A and 2B of this specification.

Figure 1E:
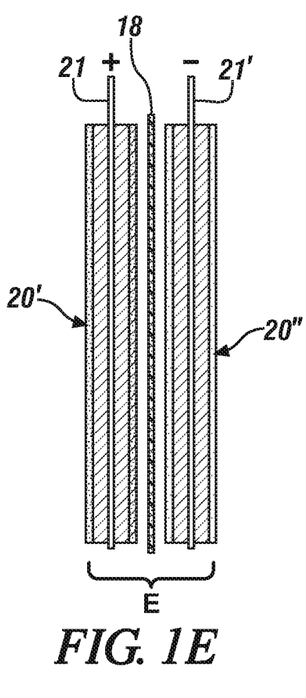
FIG. 1E is a side view of a fifth cell unit (E) which is a positively charged layered hybrid capacitor electrode (+) formed of a layer of capacitor material particles and a coextensive overlying layer of cathode material particles bonded to each side of a current collector foil and a negatively charged hybrid capacitor electrode (−) formed of a layer of capacitor material particles and a coextensive overlying layer of anode material particles bonded to each side of a current collector foil.

In FIG. 1E a fifth cell unit E is formed of a pair of layered hybrid capacitor electrodes 20', 20". Hybrid capacitor electrode 20' (positively charged) is formed of a first porous layer of capacitor particles bonded to each side of a current collector foil 21. A second porous layer of cathode particles is coextensively bonded to the outer surfaces of each of the layers of capacitor particles. Hybrid capacitor electrode 20" (negatively charged) is formed of a first porous layer of capacitor particles bonded to each side of a current collector foil 21'. A second porous layer of anode particles is coextensively bonded to the outer surfaces of each of the layers of capacitor particles. The respective charges of the layered capacitor material/cathode material electrode (+) and the layered capacitor material/anode material electrode (−) in the charged state of the cell unit are indicated on the upstanding connector tabs of their respective current collector foils (21, 21'). Facing surfaces of hybrid capacitor electrode layers (20', 20") are placed against opposite faces of a porous separator 18. The proportions of the materials in the respective electrodes of this combination are based on the intended combination of battery properties and capacitor properties of a hybrid cell. The use of such a combination of layered hybrid capacitors is illustrated in connection with the discussion of FIG. 3B of this specification.

Figure 1F:
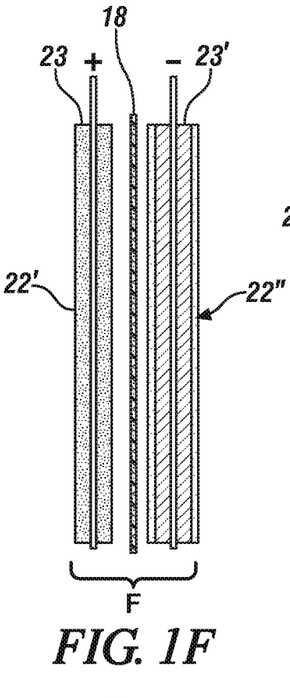
FIG. 1F is a side view of a sixth cell unit (F) formed of a positively charged electrode (+) formed of cathode particles and a negatively charged hybrid capacitor electrode (−) formed of a layer of capacitor material particles and a coextensive overlying layer of anode material particles bonded to each side of a current collector foil.

In FIG. 1F, a sixth cell unit F is illustrated, formed of a positive electrode 22' formed of porous layers of cathode material bonded to each side of an aluminum current collector 23 and a negative hybrid capacitor electrode 22" formed of a porous layer of particles of capacitor material bonded to both sides of a copper current collector 23'. Bonded to the outer surfaces of the layers of capacitor particles are coextensive porous layers of particles of anode material. The current collector foil may be aluminum when the anode material is LTO. The charges of the layered capacitor material/anode material electrode (−) and the cathode material electrode (+) in the charged stated of the cell unit are indicated on the upstanding connector tabs of their respective current collector foils (23, 23'). Facing surfaces of hybrid capacitor electrode layers (22', 22") are placed against opposite faces of a porous separator 18. The proportions of the materials in the respective electrodes of this combination are based on the intended combination of battery properties and capacitor properties of a hybrid cell. The use of such a combination of a cathode and a layered hybrid capacitor is described with respect to the discussion of 3B in his specification.

Figure 1G:
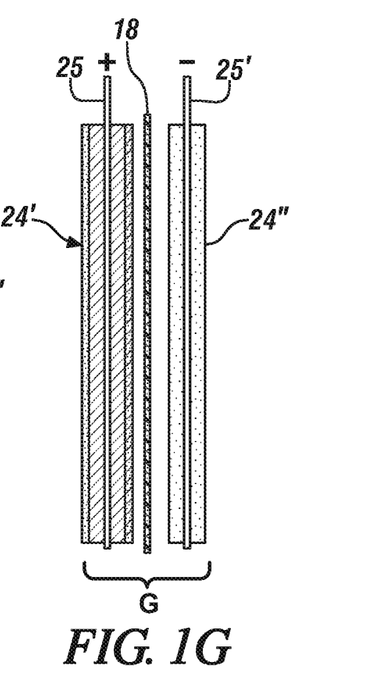
FIG. 1G is a side view of a seventh cell (G) unit formed of a positively charged, reverse-layered hybrid capacitor electrode (+) formed of a layer of capacitor particles and an overlying layer of cathode material particles bonded to each side of a current collector foil and a negatively charged (−) electrode of anode material particles.

In FIG. 1G, a seventh cell unit G is illustrated, formed of a negative electrode 24" formed of porous layers of anode material bonded to each side of a copper current collector 25' (an aluminum current collector when the anode material is LTO) and a positive hybrid capacitor electrode 24' formed of a porous layer of particles of capacitor material bonded to both sides of an aluminum current collector 25. Bonded to the outer surfaces of the layers of capacitor particles are coextensive porous layers of particles of cathode material. The charges of the layered capacitor material/anode material electrode (+) and the anode material electrode (−) in the charged stated of the cell unit are indicated on the upstanding connector tabs of their respective current collector foils (25, 25'). Facing surfaces of hybrid capacitor electrode layers (24', 24") are placed against opposite faces of a porous separator 18. The proportions of the materials in the respective electrodes of this combination are based on the intended combination of battery properties and capacitor properties of a hybrid cell. The use of such a combination of an anode and a layered hybrid capacitor is described with respect to the discussion of FIGS. 3A and 3B in his specification.

Figure 1H:
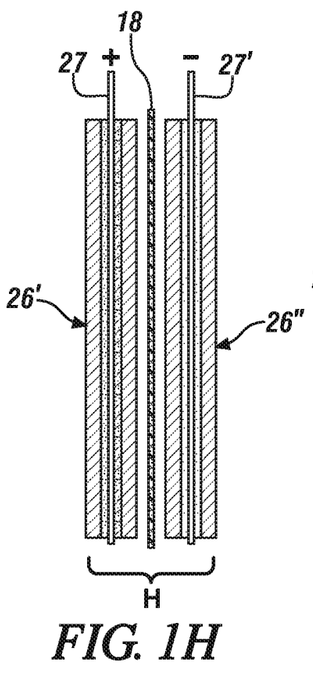
FIG. 1H is a side view of an eighth cell unit (H) which is a positively charged, reverse-layered hybrid capacitor electrode (+) formed of a layer of capacitor material particles overlying a coextensive layer of cathode material particles bonded to each side of a current collector foil and a negatively charged, reverse-layered hybrid capacitor electrode (−) formed of a layer of capacitor material particles overlying a coextensive layer of anode material particles bonded to each side of a current collector foil.

In FIG. 1H an eighth cell unit H is formed of a pair of layered hybrid capacitor electrodes 26', 26". Hybrid capacitor electrode 26' (positively charged) is formed of a first porous layer of cathode particles bonded to each side of a current collector foil 27. A second porous layer of capacitor particles is coextensively bonded to the outer surfaces of each of the layers of cathode particles. Hybrid capacitor electrode 26" (negatively charged) is formed of a first porous layer of anode particles bonded to each side of a current collector foil 27'. A second porous layer of capacitor particles is coextensively bonded to the outer surfaces of each of the layers of anode particles. The respective charges of the layered cathode material/capacitor material electrode (+) and the layered anode material/capacitor material electrode (−) in the charged stated of the cell unit are indicated on the upstanding connector tabs of their respective current collector foils (27, 27'). Facing surfaces of hybrid capacitor electrode layers (26', 26") are placed against opposite faces of a porous separator 18. The proportions of the materials in the respective electrodes of this combination are based on the intended combination of battery properties and capacitor properties of a hybrid cell. The use of such a combination of a positively charged reverse layered hybrid capacitor and a negatively charged reverse layered hybrid capacitor is described in connection with FIG. 4B of this specification.

Figure 1I:
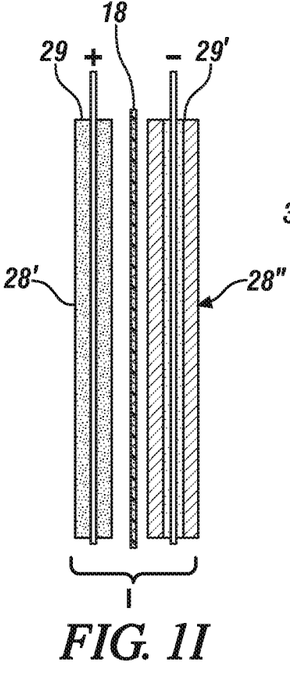
FIG. 1I is a side view of a ninth cell unit (I) formed of a positively charged electrode (+) formed of cathode particles and a negatively charged reverse-layered hybrid capacitor electrode (−) formed of a layer of capacitor material particles overlying a coextensive layer of anode material particles bonded to each side of a current collector foil.

In FIG. 1I, a ninth cell unit I is illustrated, formed of a positive electrode 28' formed of porous layers of cathode material bonded to each side of an aluminum current collector and a negative hybrid capacitor electrode 28" formed of a porous layer of particles of anode material bonded to both sides of a copper current collector 29' (or aluminum for LTO anode material). Bonded to the outer surfaces of the layers of anode particles are coextensive porous layers of particles of capacitor material. The charges of the layered anode material/capacitor material electrode (−) and the cathode material electrode (+) in the charged stated of the cell unit are indicated on the upstanding connector tabs of their respective current collector foils (29, 29'). Facing surfaces of hybrid capacitor electrode layers (28', 28") are placed against opposite faces of a porous separator 18. The proportions of the materials in the respective electrodes of this combination are based on the intended combination of battery properties and capacitor properties of a hybrid cell. The use of such a combination of a positively charged and negatively charged, reverse layered hybrid capacitors is described in connection with FIG. 4B of this specification.

Figure 1J:
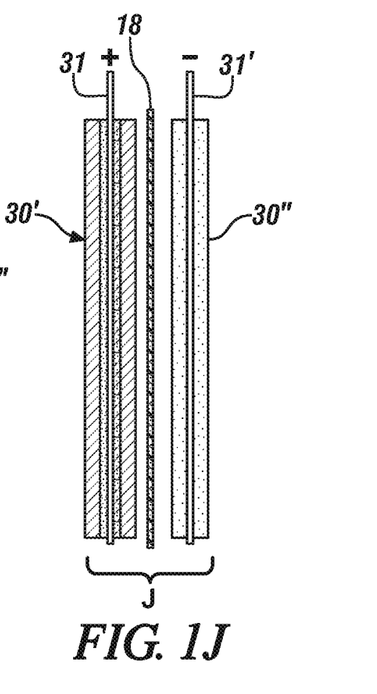
FIG. 1J is a side view of a tenth cell unit (J) formed of a positively charged reverse-layered hybrid capacitor electrode (+) formed of a layer of capacitor particles overlying a layer of cathode material particles bonded to each side of a current collector foil and a negatively charged (−) electrode of anode material particles.

In FIG. 1J, a tenth cell unit J is illustrated, formed of a negative electrode 30" formed of porous layers of anode material bonded to each side of a copper current collector 31' (or aluminum for LTO) and a positive hybrid capacitor electrode 30' formed of a porous layer of particles of cathode material bonded to both sides of an aluminum current collector 31'. Bonded to the outer surfaces of the layers of cathode particles are coextensive porous layers of particles of capacitor material. The charges of the layered capacitor material/cathode material electrode (+) and the anode material electrode (−) in the charged stated of the cell unit are indicated on the upstanding connector tabs of their respective current collector foils (31, 31'). Facing surfaces of hybrid capacitor electrode layers (30', 30") are placed against opposite faces of a porous separator 18. The proportions of the materials in the respective electrodes of this combination are based on the intended combination of battery properties and capacitor properties of a hybrid cell. The use of such a combination of a negatively charged anode and a positively charged reverse layer hybrid capacitor is described in connection with the discussion of both FIGS. 4A and 4B of this specification.

The above described cell units are used in combinations of at least two of the units (or more) and such that at least one hybrid capacitor electrode (positive or negative) is used in combination with a battery anode and cathode of the opposite charge. In each such combination of cell units, they will be assembled as stacks or wound rolls with interposed porous separator layers. And the pores of the electrode layers and separators will be infiltrated with a non-aqueous liquid electrolyte conductive of lithium cations and compatible anions.

The electrolyte for a subject hybrid lithium-ion battery/capacitor cell may be a lithium salt dissolved in one or more organic liquid solvents. Examples of suitable salts include lithium hexafluorophosphate ($LiPF_6$), lithium tetrafluoroborate ($LiBF_4$), lithium perchlorate ($LiClO_4$), lithium hexafluoroarsenate ($LiAsF_6$), and lithium trifluoroethanesulfonimide. Some examples of solvents that may be used to dissolve the electrolyte salt include ethylene carbonate, dimethyl carbonate, methylethyl carbonate, propylene carbonate. There are other lithium salts that may be used and other solvents. But a combination of lithium salt and solvent is selected for providing suitable mobility and transport of lithium ions in the operation of the hybrid cell with its battery and hybrid capacitor electrode combinations. The electrolyte is carefully dispersed into and between closely spaced layers of the electrode elements and separator layers.

In general, it is preferred to combine cell units to form a hybrid electrochemical cell producing an energy density in the range of 20 Wh/kg to 200 Wh/kg and a power density in the range of 500 W/kg and 10,000 W/kg. Values of energy density and power density depend on the composition of the battery electrode materials and of the capacitor electrode materials, and on the ratio of contents of battery electrode materials and capacitor electrode materials. In general energy density is improved by increasing battery material content and/or by selecting high specific energy battery electrode materials. And the power density of the hybrid electrochemical cell is increased by increasing the content of capacitor electrode material and/or by selecting high specific power density capacitor compositions.

Figure 2A:
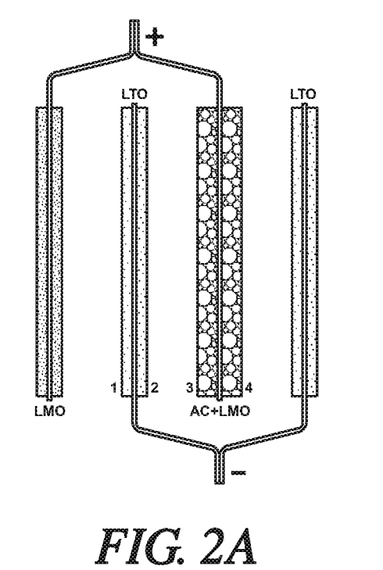
FIG. 2A is a schematic illustration of side or edge views of two lithium titanate (LTO) anodes paired with a lithium manganese oxide (LMO) battery cathode and a hybrid capacitor electrode (AC+LMO) formed of a mixture of activated carbon (AC) particles and lithium manganese oxide (LMO) particles. The LTO anode members are electrically connected and indicated as negatively charged, as they would be when the hybrid cell is being discharged. The LMO battery cathode and hybrid capacitor cathode are electrically connected and indicated as positively charged. As will be explained below in this specification, the amount of activated carbon and LMO in the capacitor cathode will be predetermined and balanced for the purpose of equalizing the flow of lithium ions during the charging of the hybrid cell. For purposes of simplifying the illustration of the hybrid cell, the separators which would be placed between the electrodes in a closely stacked assembly are not shown, and the liquid electrolyte that would be infused into the pores of the electrode materials and the separators is not illustrated. Each modification is for the purpose of equalizing the flow of lithium ions during the charging of the hybrid cell.

FIG. 2A is a schematic illustration of side-edge views of two lithium titanate (labeled LTO) anodes paired with a lithium manganese oxide (labeled LMO) battery cathode and a hybrid capacitor electrode formed of a mixture (blend) of activated carbon (AC) particles and lithium manganese oxide particles (LMO). The hybrid capacitor electrode is indicated as AC+LMO. The LTO anode members are electrically connected and indicated as negatively charged, as they would be when the hybrid cell is being discharged. The LMO battery cathode and hybrid capacitor cathode are electrically connected and indicated as positively charged. Although not apparent from the side views, each of the electrodes is of like rectangular shape with their applied porous layers of electrode material covering most of the major surfaces of the respective current collectors except for the tabs on one side of the rectangular foil, used for electrical connection with other electrode members. The thicknesses of the current collector foils are typically in the range of about seven to twenty micrometers. In an assembled, operating cell, the electrodes would be stacked or rolled with interposed separators, and the pores of the electrodes and separators would be fully infiltrated with a suitable liquid electrolyte for transporting lithium ions between the active materials of the electrodes. In FIG. 2A and the following figures, the illustrated layers of electrode materials are not intended to depict the relative capacities of the respective materials to intercalate or adsorb lithium ion or corresponding anions.

As illustrated in FIG. 2A, one of the LTO anodes is assembled and positioned between the LMO cathode and the AC+LMO hybrid capacitor. The second LTO anode is positioned on the other side of the hybrid capacitor. During charging of the cell arrangement of FIG. 2A, lithium ions are de-intercalated from the LMO cathode (then negatively charged) and from the LMO particles in the hybrid capacitor mixture (AC+LMO). Lithium ions released from the LMO electrode have direct access to side 1 of the adjacent LTO anode. Anions (e.g., $PF_6^-$) are released by the activated carbon particles (AC) of the hybrid capacitor and enter the electrolyte to contribute to balancing the lithium cations. The lithium ions are released at a rate and in an amount, such that they are suitably and appropriately intercalated into the two LTO anodes (positively charged during cell charging). Thus, the hybrid capacitor releases lithium ions from both of its sides (3, 4), directed to side 2 of the bounded LTO anode and to the adjacent outer LTO anode. The lithium ions are to be intercalated and not simply adsorbed and not suitable utilized by the LTO anodes.

The purpose of mixing LMO particles and AC particles in the hybrid capacitor electrode is to provide a combination of capacities that will balance the flow of lithium ions and corresponding anions during the charging and discharging cycles of the hybrid cell. It is preferred that the respective amounts and capacities of each of the materials bonded to the oppositely charged electrodes in the hybrid cell generally balance each other in order to achieve the flows of ions. Of particular concern are the relative capacities of the LTO particles in side 2 of the inner LTO electrode and side 3 of the hybrid AC+LMO capacitor electrode. It is preferred that $C_{LTO-2}/C_{(AC+LMO)-3}=0.8\text{-}1.2$, where C represents the molar capacities of the respective electrode materials to accept lithium ions or corresponding anions.

Figure 2B:
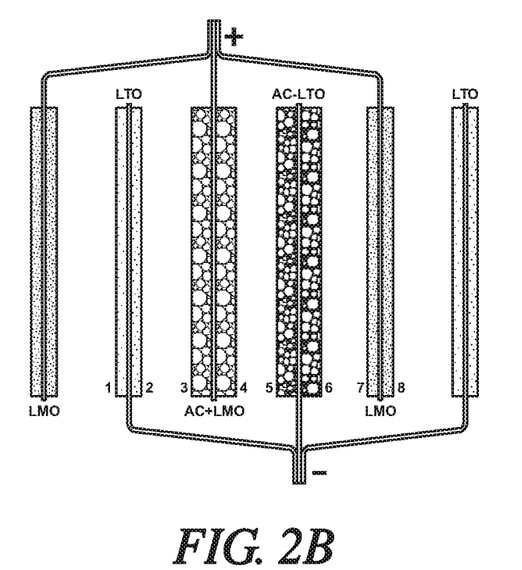
FIG. 2B is a schematic illustration of side or edge views of two lithium titanate (LTO) anodes and a hybrid (AC+LTO) capacitor electrode which are assembled with two LMO cathodes and a hybrid AC+LMO capacitor electrode. The hybrid (AC+LMO) capacitor is formed of porous layers of a mixture of activated carbon particles and lithium manganese oxide particles. The hybrid AC+LTO capacitor electrode is formed of porous layers of a mixture of activated carbon particles and lithium titanate particles. The anode members are electrically connected and indicated as negatively charged. The cathode members are electrically connected and indicated as positively charged. Each modification is for the purpose of equalizing the flow of lithium ions during the charging of the hybrid cell.

In the hybrid battery/capacitor electrochemical cell of FIG. 2B, a set of two outer, plus-charged (+), LMO cathodes and a centered, plus-charged AC+LMO hybrid capacitor are alternately inter-positioned and assembled with two outer, minus-charged (−) LTO anodes and a centered, minus-charged, AC+LTO hybrid capacitor. The two oppositely-charged hybrid capacitors are placed side-by-side in the center of the assembled cell with its three pairs of electrodes. The hybrid capacitors were each formed using mixtures of particles of activated carbon and particles of the indicated anode material (LTO) or cathode material (LMO). Side 4 of the AC+LMO hybrid capacitor faces side 5 of the AC+LTO hybrid capacitor. Side 2 of an LTO anode faces side 3 of the AC+LMO hybrid capacitor and side 7 of an LMO cathode faces side 6 of the AC+LTO hybrid capacitor. An outer LMO cathode (left side of FIG. 2B) faces side 1 of the inner LTO anode. And an outer LTO anode faces side 8 of the adjacent LMO cathode.

In the cell assembly of FIG. 2B, it is important to match the flow of lithium ions and their associated anions between side 2 of the LTO anode facing side 3 of the AC+LMO hybrid capacitor. Preferably the amounts and capacities (C) of the respective lithium titanate, lithium manganese oxide, and activated carbon materials are such that $C_{LTO-2}/C_{(AC+LMO)-3}=0.8\text{-}1.2$. And, it is important to match the flow of ions between side 7 of the LMO cathode facing side 6 of the AC+LTO hybrid capacitor. Preferably, the capacities of the same electrode materials are such that $C_{(AC+LTO)6}/C_{LMO7}=0.8\text{-}1.2$.

Figure 3A:
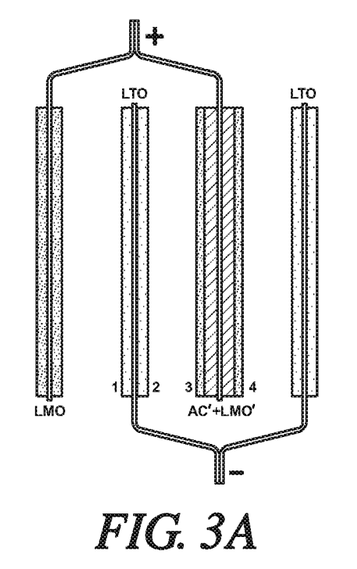
FIG. 3A is a simplified schematic side-view of a modified version of the hybrid grouping of FIG. 2A.
Figure 3B:
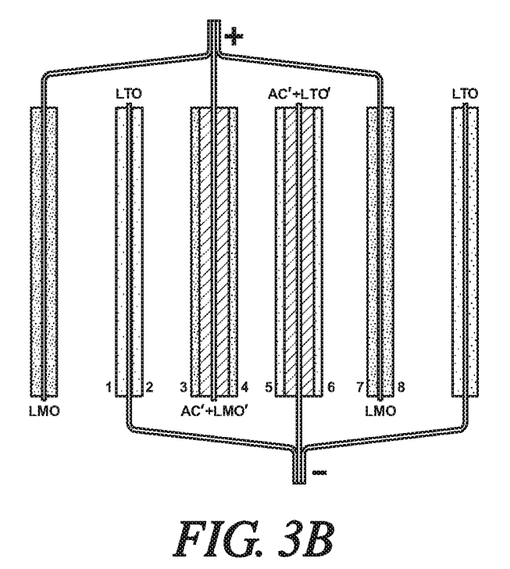
FIG. 3B is a simplified schematic side-view of a second modified version of the hybrid grouping of FIG. 2B.

In the illustrations of FIGS. 3A and 3B, the layered hybrid capacitors were formed by applying a porous layer of activated carbon capacitor particles (AC) resin bonded to each of the opposing surfaces of a current collector foil and then applying a co-extensive porous layer of anode material particles (LTO) or cathode material particles (LMO) resin bonded to each of the AC layers. The resulting hybrid capacitors were two-side bonded layered structures (on each side of a current collector foil) of active electrode material overlying activated carbon, AC'+LMO' or AC'+LTO'.

In FIG. 3A, one of the LTO anodes is assembled between the LMO cathode and the layered AC'+LMO' hybrid capacitor. The second LTO anode is positioned on the other side of the layered hybrid capacitor. During charging of the cell arrangement of FIG. 3A, lithium ions are de-intercalated from the LMO cathode (then negatively charged) and from the LMO particles in the layered hybrid capacitor (AC'+LMO'). Lithium ions released from the LMO electrode have direct access to side 1 of the adjacent LTO anode. Anions (e.g., $PF_6^-$) are released by the layer of activated carbon particles (AC) of the hybrid capacitor and enter the electrolyte to contribute to the balance of lithium cations entering the electrolyte. The lithium ions are released at a rate and in an amount, such that they are suitably and appropriately intercalated into the two LTO anodes (positively charged during cell charging). Thus, the hybrid capacitor releases lithium ions from both of its sides (3, 4), directed to side 2 of the bounded LTO anode and to the adjacent outer LTO anode. The lithium ions are to be intercalated and not simply adsorbed and not suitable utilized by the LTO anodes.

Again, it is important to balance the relative capacities of the LTO particles in side 2 of the inner LTO electrode and side 3 of the hybrid AC'+LMO' capacitor electrode. It is preferred that $C_{LTO-2}/C_{(AC'+LMO')-3}=0.8-1.2$, where C represents the molar capacities of the respective electrode materials to accept lithium ions or corresponding anions.

In the hybrid layered battery/capacitor electrochemical cell of FIG. 3B, a set of two outer LMO cathodes, plus-charged (+), and a centered, plus-charged AC'+LMO' layered hybrid capacitor are alternately inter-positioned and assembled with two outer, minus-charged (−). LTO anodes and a centered, minus-charged, AC'+LTO' layered hybrid capacitor. The two oppositely-charged layered hybrid capacitors are placed side-by-side in the center of the assembled cell with its three pairs of electrodes. Side 4 of the AC'+LMO' layered hybrid capacitor faces side 5 of the AC'+LTO' layered hybrid capacitor. Side 2 of an LTO anode faces side 3 of the AC'+LMO' layered hybrid capacitor and side 7 of an LMO cathode faces side 6 of the AC'+LTO' layered hybrid capacitor. An outer LMO cathode (left side of FIG. 3B) faces side 1 of the inner LTO anode. And an outer LTO anode faces side 8 of the adjacent LMO cathode.

In the cell assembly of FIG. 3B, it is important to match the flow of lithium ions and their associated anions between side 2 of the LTO anode facing side 3 of the AC+LMO layered hybrid capacitor. Preferably, the amounts and capacities (C) of the respective lithium titanate, lithium manganese oxide, and activated carbon materials are such that $C_{LTO-2}/C_{(AC'+LMO')-3}=0.8-1.2$. And, it is important to match the flow of ions between side 7 of the LMO cathode facing side 6 of the AC'+LTO' hybrid capacitor. Preferably, the capacities of the same electrode materials are such that $C_{(AC'+LTO')-6}/C_{LMO-7}=0.8-1.2$.

Figure 4A:
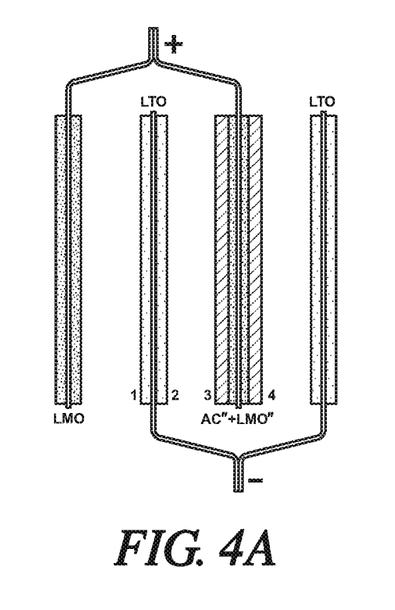
FIG. 4A is a simplified schematic side-view of a second modified version of the hybrid grouping of FIG. 2A.
Figure 4B:
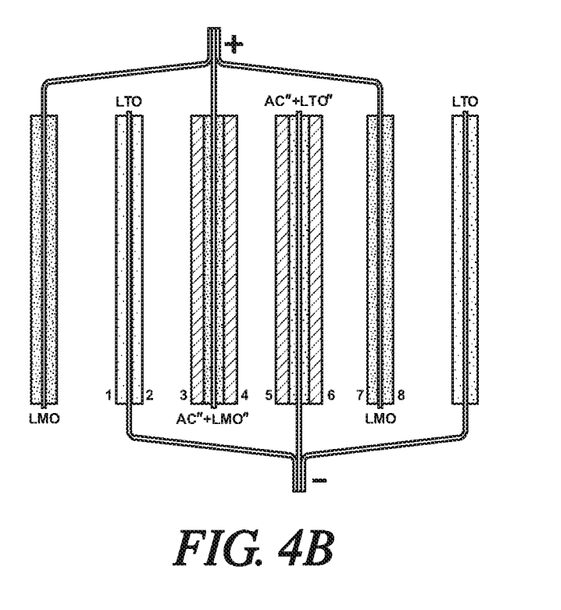
FIG. 4B is a simplified schematic side-view of a second modified version of the hybrid grouping of FIG. 2B.

In the illustrations of FIGS. 4A and 4B, the reverse-layered, hybrid capacitors were formed by applying a co-extensive porous layer of anode material particles (LTO) or cathode material particles (LMO) resin bonded to the opposing surfaces of a current collector foil and then applying a co-extensive bonded porous layer of activated carbon particles overlying the porous layers of anode material particles or cathode material particles. The resulting reverse-layered, hybrid capacitors were two bonded layer structures of activated carbon capacitor material overlying active electrode material, AC"+LMO" or AC"+LTO". In the following text, this organization of the applied porous layers will be referred to the reverse-layered hybrid capacitors.

In FIG. 4A, one of the LTO anodes is assembled between the LMO cathode and the reverse-layered AC"+LMO" hybrid capacitor. The second LTO anode is positioned on the other side of the reverse-layered hybrid capacitor. During charging of the cell arrangement of FIG. 4A, lithium ions are de-intercalated from the LMO cathode (then negatively charged) and from the LMO particles in the reverse-layered hybrid capacitor (AC"+LMO"). Lithium ions released from the LMO electrode have direct access to side 1 of the adjacent LTO anode. Anions (e.g., $PF_6^-$) are released by the layer of activated carbon particles (AC) of the reverse-layered hybrid capacitor and enter the electrolyte to contribute to the balance of lithium cations entering the electrolyte. The lithium ions are released at a rate and in an amount, such that they are suitably and appropriately intercalated into the two LTO anodes (positively charged during cell charging). Thus, the hybrid reverse-layered capacitor releases lithium ions form both of its sides (3, 4), directed to side 2 of the bounded LTO anode and to the adjacent outer LTO anode. The lithium ions are to be intercalated and not simply adsorbed and not suitable utilized by the LTO anodes.

And again, it is important to balance the relative capacities of the LTO particles in side 2 of the inner LTO electrode and side 3 of the reverse-layered hybrid AC"+LMO" capacitor electrode. It is preferred that $C_{LTO-2}/C_{(AC"+LMO")-3}=0.8-1.2$, where C represents the molar capacities of the respective electrode materials to accept lithium ions or corresponding anions.

In the reverse-layered, hybrid battery/capacitor electrochemical cell of FIG. 4B, a set of two outer, plus-charged (+), LMO cathodes and a centered, plus-charged AC"+LMO" reverse-layered hybrid capacitor is alternately interposed and assembled with two outer, minus-charged (−). LTO anodes and a centered, minus-charged, AC"+LTO" reverse-layered hybrid capacitor. The two oppositely-charged reverse-layered hybrid capacitors are placed side-by-side in the center of the assembled cell with its three pairs of electrodes. Side 4 of the AC"+LMO" reverse-layered hybrid capacitor faces side 5 of the AC"+LTO" reverse-layered hybrid capacitor. Side 2 of an LTO anode faces side 3 of the AC"+LMO" reverse-layered hybrid capacitor and side 7 of an LMO cathode faces side 6 of the AC"+LTO" reverse-layered hybrid capacitor. An outer LMO cathode (left side of FIG. 3B) faces side 1 of the inner LTO anode. And an outer LTO anode faces side 8 of the adjacent LMO cathode.

In the cell assembly of FIG. 4B, it is important to match the flow of lithium ions and their associated anions between side 2 of the LTO anode facing side 3 of the AC"+LMO" reverse-layered hybrid capacitor. Preferably, the amounts and capacities (C) of the respective lithium titanate, lithium manganese oxide, and activated carbon materials are such that $C_{LTO-2}/C_{(AC"+LMO")-3}=0.8-1.2$. And, it is important to match the flow of ions between side 7 of the LMO cathode facing side 6 of the AC"+LTO" hybrid capacitor. Preferably, the capacities of the same electrode materials are such that $C_{(AC"+LTO")-6}/C_{LMO-7}=0.8-1.2$.

The above specific examples are intended to illustrate practices of the invention, but these illustrations are not limitations on the scope of the invention. It is clear that the above described basic hybrid electrodes and hybrid combinations of electrodes may be readily prepared and combined to make widely different useful hybrid electrochemical cells with different combinations and balances of battery and capacitor properties.

The invention claimed is:

1. An electrochemical cell comprising an assembly of at least two pairs of stacked or wound rolls of facing electrodes of opposed electrical charge, each electrode consisting of a two-sided current collector foil coated on both sides with a porous layer of particles of the same electrode material, each coated layer of electrode material being one selected from the group consisting of (i) a lithium ion intercalating/de-intercalating anode material for a lithium-ion battery, (ii) a lithium ion intercalating/de-intercalating cathode material for a lithium-ion battery, and (iii) a hybrid lithium ion adsorbing/desorbing, or corresponding anion adsorbing/desorbing, combination of capacitor material that is mixed or layered with particles of an anode or cathode material, the porous layers of each electrode being separated from each other by the two-sided current collector foil and from a facing layer of an electrode by an inter-positioned co-extensive porous separator layer, the pores of the facing electrode materials and the separators being infiltrated with a non-aqueous electrolyte solution containing lithium cations and corresponding anions;

the assembly of the at least two pairs of facing, opposing electrical charge electrodes including at least one electrode of lithium-ion battery anode material facing an opposing electrode of lithium ion-battery cathode material and at least one hybrid material electrode of capacitor material combined with anode or cathode material facing an electrode of opposing lithium-ion battery anode material or an electrode of opposing cathode material, the measured lithium ion accepting capacity of the capacitor material combined with anode or cathode material and the measured lithium ion accepting capacity of the facing anode or cathode material being in the ratio range of 0.8-1.2; and the coated layers on the at least two pairs of opposing electrodes being selected to obtain a predetermined combination of energy density (Wh/kg) and power density (W/kg) for the electrochemical cell.

2. An electrochemical cell as stated in claim 1 in which the anode material is lithium titanate, the cathode material is lithium manganese oxide, and the capacitor material is activated carbon.

3. An electrochemical cell as stated in claim 1 in which the electrochemical cell comprises two to four positive-charge electrode members interposed with a like number of negative-charge electrode members, at least one of the electrode members being a hybrid electrode material formed of particles of capacitor composition and particles of anode or cathode composition facing a battery electrode composition of the opposite charge, the measured lithium ion accepting capacity of the hybrid electrode material and the measured lithium ion accepting capacity of the battery composition material being in the ratio range of 0.8-1.2.

4. An electrochemical cell as stated in claim 3 in which the anode material is lithium titanate, the cathode material is lithium manganese oxide, and the capacitor material is activated carbon.

5. An electrochemical cell as stated in claim 3 in which the hybrid electrode material is formed of a mixture of capacitor particles and particles of active anode material or cathode material bonded as porous electrode layers to both sides of a current collector foil.

6. An electrochemical cell as stated in claim 5 in which the anode material is lithium titanate, the cathode material is lithium manganese oxide, and the capacitor material is activated carbon.

7. An electrochemical cell as stated in claim 3 in which the hybrid electrode material is formed of a porous layer of capacitor particles bonded to both sides of a current collector foil, and a porous layer of particles of active anode material or cathode material is bonded coextensively to each of the porous layers of capacitor particles.

8. An electrochemical cell as stated in claim 7 in which the anode material is lithium titanate, the cathode material is lithium manganese oxide, and the capacitor material is activated carbon.

9. An electrochemical cell as stated in claim 3 in which the hybrid electrode material is formed of a porous layer of particles of anode material or cathode material bonded to both sides of a current collector foil and a porous layer of capacitor material is bonded coextensively to the outer side of each of the porous layers of anode material or cathode material.

10. An electrochemical cell as stated in claim 9 in which the anode material is lithium titanate, the cathode material is lithium manganese oxide, and the capacitor material is activated carbon.

11. An electrochemical cell as stated in claim 1 in which the electrochemical cell comprises two anode members and a negatively-charged hybrid electrode material member alternately interposed with two cathode members and a positively-charged hybrid electrode material member, the oppositely-charged hybrid electrode material members being adjacent electrode members with an anode member adjacent to the positively charged hybrid electrode material member and a cathode member adjacent to the negatively charged hybrid electrode material member.

12. An electrochemical cell as stated in claim 11 in which the anode material is lithium titanate, the cathode material is lithium manganese oxide, and the capacitor material is activated carbon.

13. An electrochemical cell as stated in claim 11 in which each hybrid electrode material member is formed of a porous layer of a mixture of capacitor particles and particles of active anode material or cathode material bonded to both sides of a current collector foil.

14. An electrochemical cell as stated in claim 11 in which each hybrid electrode material member is formed of a porous layer of capacitor particles bonded to both sides of a current collector foil and a porous layer of particles of active anode material or cathode material bonded coextensively to each of the porous layers of capacitor particles.

15. An electrochemical cell as stated in claim 11 in which each hybrid electrode material member is formed of a porous layer of particles of anode material or cathode material bonded to both sides of a current collector foil and a porous layer of capacitor material bonded coextensively to the outer surface of each of the porous layers of anode material or cathode material.

16. A hybrid electrode material member for a lithium ion electrochemical cell, the hybrid electrode material member being shaped and adapted to be assembled adjacent to at least one anode or cathode member of the electrochemical cell, but physically separated from the anode or cathode member by a porous separator member; the hybrid electrode material member being formed of a combination of (i) lithium ion adsorbing/desorbing particles of capacitor material and (ii) lithium ion intercalating/de-intercalating particles of one of the anode material or the cathode material, the combination of hybrid electrode material particles being resin bonded as one or two porous layers to each side of a metal current collector foil.

17. A hybrid electrode material member as stated in claim 16 in which the measured lithium ion accepting capacity of the combined hybrid electrode material member and the measured lithium ion accepting capacity of the anode material or of the cathode material in the adjacent anode or cathode being in the ratio range of 0.8-1.2.

18. A hybrid electrode material member as stated in claim 16 in which the hybrid electrode material member is formed of a single porous layer of a blended mixture of capacitor particles and particles of one of the anode material and cathode material, the single porous layer being bonded to each side of the metal current collector foil.

19. A hybrid electrode material member as stated in claim 16 in which the hybrid electrode material member is formed of a first porous layer of one of capacitor particles or of particles of one of the anode material and cathode material bonded to each side of the metal current collector foil, and a second porous layer of the other hybrid capacitor material, which is co-extensively overlying and bonded to the first porous layer.

20. A hybrid electrode material member as stated in claim 16 in which the electrode material member particles are particles of activated carbon, the anode particles are particles of lithium titanate, and the cathode particles are particles of lithium manganese oxide.

* * * * *